July 18, 1939. E. WITZENMANN 2,166,511
PNEUMATIC TIRE
Filed Nov. 26, 1938
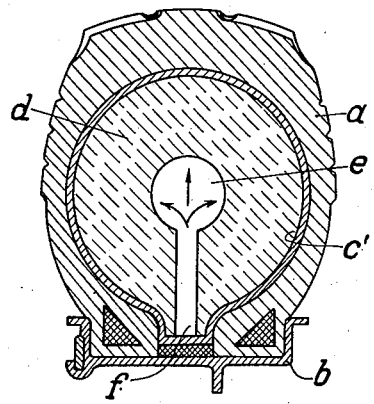
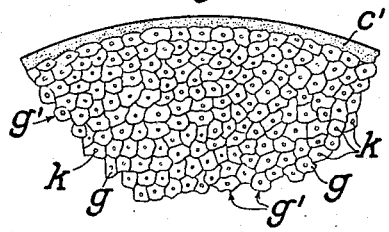
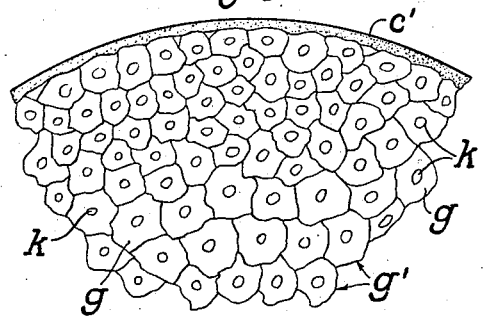
Inventor:
E. Witzenmann
By: Glascock Downing & Seebold
Attys.

Patented July 18, 1939

2,166,511

UNITED STATES PATENT OFFICE 2,166,511

PNEUMATIC TIRE

Emil Witzenmann, Pforzheim, Baden, Germany

Application November 26, 1938, Serial No. 242,613
In Germany January 27, 1938

4 Claims. (Cl. 152—157)

In connection with pneumatic tires, especially so-called "high-pressure" motor vehicle tires, dangerous defects are often caused chiefly by foreign bodies (such as nails, pins, splinters of glass, and so forth) penetrating the outer cover and making their way through the latter to the inner tube which they puncture so that the air contained under high pressure therein escapes through the wall of the outer cover, or at its seating on the wheel rim. Another source of damage to pneumatic tires is the inevitable extensive heating of the structure of the tire occurring at high speeds or during a prolonged run, especially under a hot sun. This softens the inner tube to some extent and tends to weaken it and may then lead to the bursting of the tube and consequently to the destruction of the outer cover.

An object of the present invention is to minimise these inconveniences without notably increasing the weight of the tire or affecting its resilience.

Further objects of the invention are to substantially protect the inner tube from the effects of undue absorption of heat, ensure the maintenance of good resilience of the tire, enable the tire to be subjected to maximum stressing, and above all safeguard the tire from sudden collapse and the consequences of accident occasioned thereby.

With these objects in view the present invention provides a new and improved inflatable tire tube comprising an annular body of spongy rubber presenting intercommunicating cells open to its interior and an integrally formed impervious outer skin produced by vulcanization, said cells being permeated with compressed air on inflation of said tube, and said body, in the event of its impervious skin being punctured, forming an auxiliary cushion allowing the imprisoned air to escape only slowly.

The accompanying drawing represents a typical embodiment of the invention, Fig. 1 being a cross section of a complete tire, and Figs. 2 and 3 fragmentary cross sections of the tire tube before and after inflation.

$a$ denotes the tire outer cover, $b$ the divided wheel rim, and $d$ an annular body of spongy rubber presenting a central annular passage $e$ into which compressed air is admitted, through a passage $f$, on the tire being inflated.

According to the invention, the spongy rubber body $d$ is surrounded by a rubber skin $c'$, produced by vulcanization and forming a unit with said body, thereby rendering the body completely impervious to air, on the outer side, in a simple manner.

On pumping up the tube $c'$, $d$ the cellular structure of the body $d$ is uniformly permeated with compressed air since the individual cells $g$ (Fig. 2) bounded by the walls $g'$ and intercommunicating through the passages $k$ are powerfully inflated (Fig. 3), so that the outer walling or sheathing $c'$ bears firmly against the inside of the outer cover $a$.

In the event of damage to the tire and consequently to the inner tube, the imprisoned compressed air escapes only at a slow rate and the contracting spongy structure under the slow collapsing of the individual walls $g'$ of the cells $g$, forms a resilient cushion which prevents sudden collapse and therefore partial or complete destruction of the tire and the occurrence of accidents resulting therefrom.

It is also evident that the spongy-rubber structure affords a kind of insulation against undue heating of the interior of the tire, since much of the air is uniformly distributed, in the form, as it were, of small individual cells.

The skin $c'$ if punctured can be repaired in the usual manner without trouble.

Owing to the employment of spongy rubber, which is of very low weight, there is only a very inconsiderable increase in the weight of the tire.

I claim:

1. An inflatable tire tube comprising an annular body of spongy rubber presenting intercommunicating cells open to its interior and an integrally formed impervious outer skin, said cells being permeated with compressed air on inflation of said tube, and said body in the event of its outer impervious skin being punctured forming an auxiliary cushion allowing the imprisoned air to escape only slowly.

2. An inflatable tire tube as claimed in claim 1, wherein the said annular body has a central cavity of circular cross section.

3. An inflatable tire tube as claimed in claim 1, wherein the said annular body has a central cavity of circular cross section and an inwardly directed radial passage in communication therewith.

4. A pneumatic tire comprising, in combination, an outer cover, and an inner inflatable tube composed of an annular body of spongy rubber presenting intercommunicating cells open to its interior and of an integrally formed impervious outer skin.

EMIL WITZENMANN.